United States Patent
Kayser

(10) Patent No.: US 6,997,476 B2
(45) Date of Patent: Feb. 14, 2006

(54) GAS BAG MODULE

(75) Inventor: Jens Kayser, Eschau (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/458,974

(22) Filed: Jun. 11, 2003

(65) Prior Publication Data

US 2004/0004345 A1    Jan. 8, 2004

(30) Foreign Application Priority Data

Jul. 4, 2002    (DE) ................................ 102 30 140

(51) Int. Cl.
*B60R 21/26*    (2006.01)

(52) U.S. Cl. .................... 280/740; 280/742
(58) Field of Classification Search ................ 280/740, 280/742, 736
See application file for complete search history.

(56) References Cited

U.S. PATENT DOCUMENTS

| | | | |
|---|---|---|---|
| 5,028,070 A * | 7/1991 | Bender ....................... 280/741 |
| 5,087,070 A | 2/1992 | O'Loughlin et al. |
| 5,505,488 A * | 4/1996 | Allard ......................... 280/740 |
| 5,816,612 A * | 10/1998 | Faigle et al. ................ 280/740 |
| 6,412,816 B1 * | 7/2002 | Gast et al. .................. 280/736 |
| 2002/0125704 A1 | 9/2002 | Heindl |

FOREIGN PATENT DOCUMENTS

| | | |
|---|---|---|
| DE | 4141906 | 7/1992 |
| DE | 20104044 | 8/2001 |
| DE | 20219284 | 3/2003 |
| EP | 0773142 | 5/1997 |

* cited by examiner

*Primary Examiner*—Eric Culbreth
(74) *Attorney, Agent, or Firm*—Tarolli, Sundheim, Covell & Tummino L.L.P.

(57) ABSTRACT

A gas bag module for a vehicle occupant restraint device comprises a gas generator and a gas bag having a wall. The module further includes a diffusor which surrounds the gas generator and has a cup-shaped section. The cup-shaped section has a filter section consisting of at least one fiber, through which filter section gas flows out from the gas generator.

20 Claims, 3 Drawing Sheets

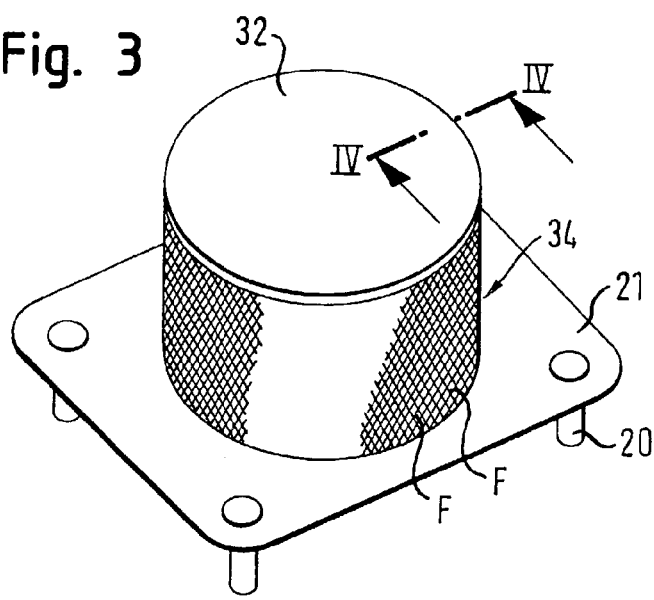
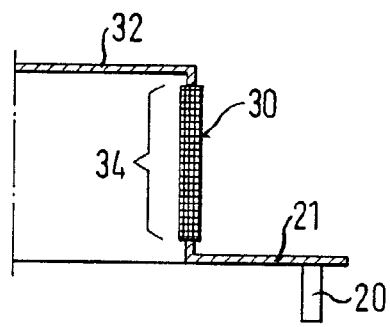
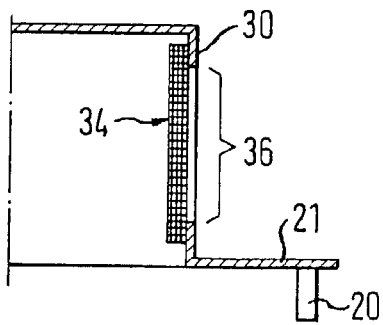
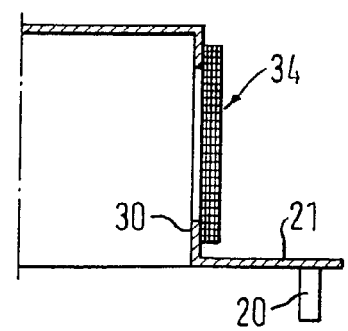

GAS BAG MODULE

TECHNICAL FIELD

The invention relates to a gas bag module for a vehicle occupant restraint device.

BACKGROUND OF THE INVENTION

Gas bag modules usually have a gas generator and a gas bag with a wall, and a diffusor which surrounds the gas generator and has a cup-shaped section. The diffusor and the gas generator are distinct, separate components.

In order to increase the safety of gas bags which are filled by means of pyrotechnic gas generators, among other things provision may be made to clean the gas, flowing out from the gas generator, from particles. By flowing through the filter, the temperature of the gas arriving into the gas bag is also reduced.

It is an aim of the invention to achieve such a function with a gas bag module which is favorably priced and is simple to manufacture.

BRIEF SUMMARY OF THE INVENTION

According to the invention, a gas bag module for a vehicle occupant restraint device comprises a gas generator and a gas bag having a wall. The module further includes a diffusor which surrounds the gas generator and has a cup-shaped section. The cup-shaped section has a filter section consisting of at least one fiber, through which filter section gas flows out from the gas generator. In prior art, the diffusor always had outflow openings which were very large, so that no filter function was provided. Therefore also none of the particles released on combustion of pyrotechnic material were retained in the diffusor. The invention makes provision that the cup-shaped diffusor, which usually consists of a side wall, a cover and a ring-shaped flange projecting outwards on the edge of the side wall opposite the cover, is used for cooling and filtering the gas. Thus, it is either possible to arrange a smaller dimensioned filter inside the gas generator which has a closed outer housing, or to do without a filter at all. The good filter action of the diffusor is achieved in that the filter section consists of one or more fiber(s), for example made of a textile, knitted mesh, knitted or woven fabric or a fleece or an irregular connection of the one or more fiber(s).

According to a first and preferred embodiment, at least the entire cup-shaped section, preferably even the entire diffusor, is made of the material consisting of the one or more fiber(s), i.e. the textile or the like.

According to a second embodiment, only the side wall of the cup-shaped section is made of the material consisting of the one or more fiber(s).

A third embodiment makes provision that the diffusor consists of a metal sheet with openings which is covered by the material of the one or more fiber(s).

The preferred embodiment, as already mentioned, makes provision that the entire diffusor is formed from the material consisting of the one or more fiber(s). It has been surprisingly found that such material, in particular a woven or knitted material, is sufficiently inherently stable to undertake the function of a gas bag support, for example.

Hereby, several advantages present themselves. The number of components is reduced, because no support has to be provided additionally to the external filter. At the same time, the weight and overall size of the gas bag module are reduced. A further advantage lies in that standard gas generators can be used even on occasions in which, with a small amount of available space, an additional filtering of the gas is desired.

The cup-shaped section of the diffusor can at least partially surround the gas generator and at the same time serve as a spacer for the gas generator to the wall of the gas bag.

The material, in particular the knitted mesh or woven fabric, is designed such that it acts as a particle filter for gas flowing through it, e.g. by the mesh size and the wire diameter being selected accordingly or by using several superimposed layers of knitted mesh. Here, it is particularly advantageous if the gas on its way from the gas generator to the gas bag flows through the diffusor over an as large an area as possible, because an optimum filter effect can thus be achieved.

The material, in particular the knitted mesh or woven fabric, additionally provides for a uniform distribution of the gas emerging from the gas generator. Through the design of the filter material of the cup-shaped section, the speed at which the gas flows into the gas bag can also be influenced, in order to carry out a coordinating of the restraint device.

It is, in fact, particularly advantageous if the diffusor serves as a particle filter; however, it is also possible to use a coarse-meshed knitted mesh or woven fabric with a large fiber spacing, which merely prevents the contact of the gas generator with the wall of the gas bag and, for example, serves as bearing surface and support for the gas bag in the folded state.

Preferably, the material consists of metal wire fibers.

In an advantageous embodiment of the invention, the cup-shaped section of the diffusor is designed as a deformation element. For this, an upper face of the cup-shaped section is preferably spaced apart from the gas generator, so that in the case of an impact of a vehicle occupant, a portion of the impact energy can be reduced by the deformation of the diffusor. Through the design of the knitted mesh, the energy required for the deformation can be determined in advance in relatively narrow limits, so that a flexible adaptation of the restraint device is possible.

In a preferred embodiment of the invention, the gas generator is mounted by an elastical bearing so as to be able to oscillate. In this case, the diffusor made from the fiber material serves as a so-called vibration-reducing cage which is able to absorb at least part of the oscillation energy occurring in the form of vibrations of the gas generator. As in such case a gas bag support which separates the gas generator from gas bag wall is absolutely necessary, a particularly great saving on space and weight can be achieved through the use of a diffusor of, for example, knitted mesh or woven fabric.

BRIEF DESCRIPTION OF THE DRAWINGS

FIG. 3 shows a perspective view of a further embodiment of the diffusor;

FIG. 4 shows a half section through the diffusor according to FIG. 3 along line IV—IV;

FIG. 5 shows a half sectional view through a diffusor according to a third embodiment;

FIG. 6 shows a half section through the diffusor according to a fourth embodiment;

DETAILED DESCRIPTION OF THE PREFERRED EMBODIMENTS

Figure 1:
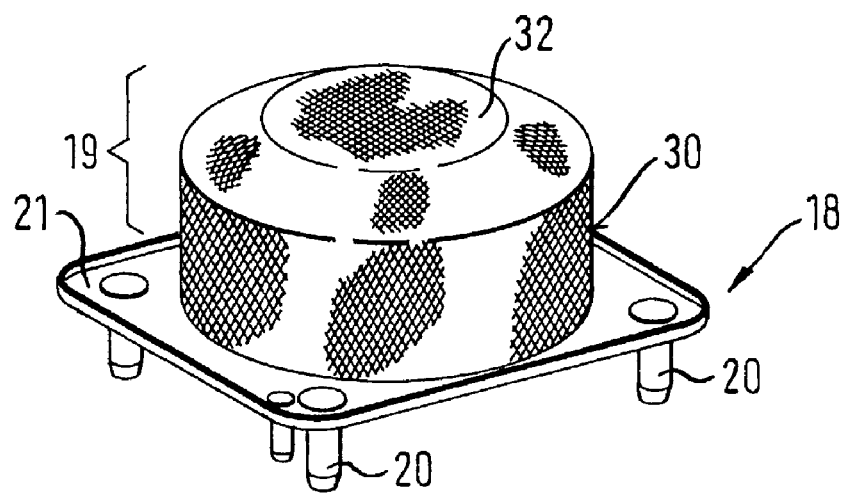
FIG. 1 shows a perspective view of a diffusor of a gas bag module according to the invention.
Figure 2:
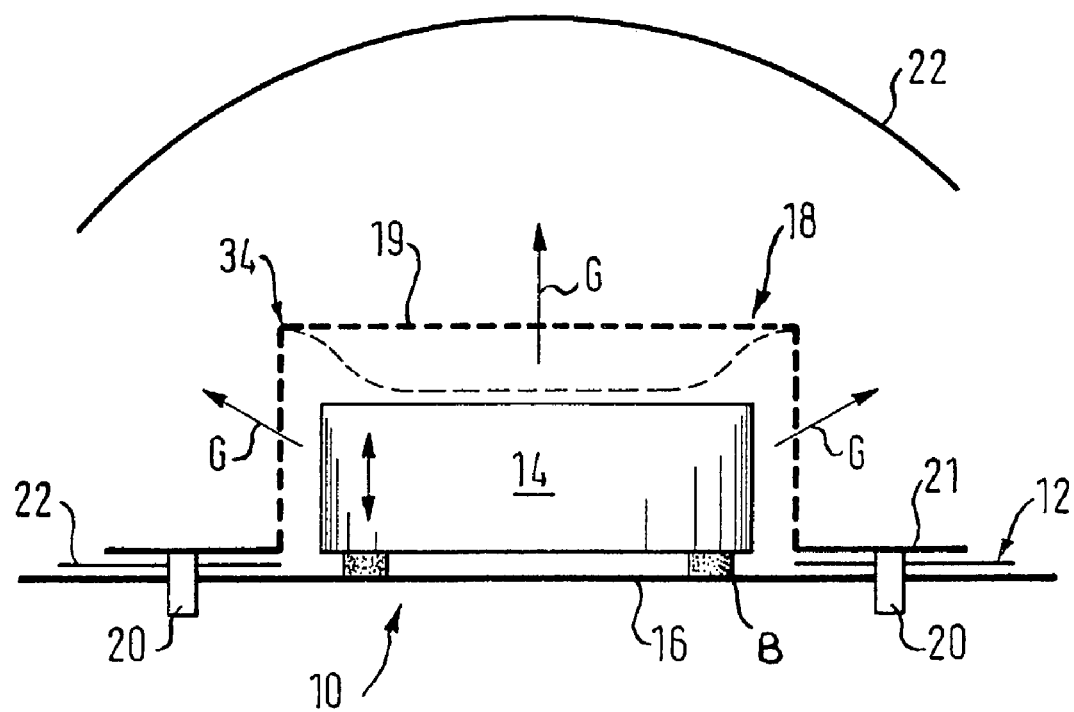
FIG. 2 shows a diagrammatic sectional view of a gas bag module according to the invention with the diffusor of FIG. 1.

FIG. 2 shows a gas bag module 10 with a gas bag 12 shown in the inflated state. A gas generator 14 is mounted on elastical bearings B so as to be able to oscillate and is connected with a vehicle-fixed part 16, e.g. a steering wheel. The gas generator is partially surrounded by a diffusor 18, a so-called vibration-reducing cage, which is illustrated in detail in FIG. 1. This vibration-reducing cage has a cup-shaped section 19 with a cylindrical side wall 30 and a cover 32. The side wall 30, or the entire cup-shaped section consisting of side wall 30 and cover 32, is completely made from filter material. A ring-shaped flange 21 adjoins the edge of the side wall 30 facing away from the cover 32. The diffusor 18 is fastened to the vehicle-fixed part 16 by means of pins 20 which engage on the flange 21. The edge of an inflow opening of the gas bag 12 is clamped between the flange of the diffusor and the vehicle-fixed part 16. The diffusor is an element which is structurally separate from the gas generator and surrounds the latter on all sides with a defined spacing. The vertically deformed edges of the flange 21 and the cover 32 to which the filter is attached can be omitted.

The diffusor 18 is arranged between the gas generator 14 and the wall 22 of the gas bag 12. In the folded state, the gas bag 12 lies on the upper face of the cup-shaped section 19. The wall 22 of the gas bag 12 can therefore at no point come in direct contact with the gas generator 14 which is hot during operation. The gas generator 14 is arranged spaced apart from the diffusor 18 such that it can perform its function as a vibration damper unimpeded inside the diffusor 18.

Figure 7A:
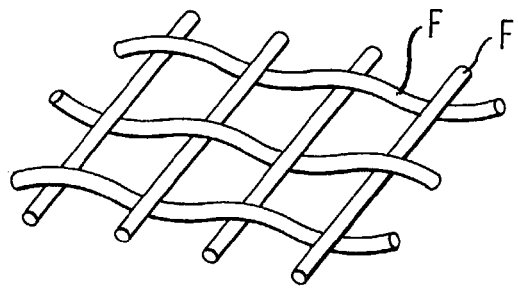
FIGS. 7a to 7c show detail views of various materials which are used in the gas bag module according to the invention in the cup-shaped section of the diffusor.
Figure 7B:
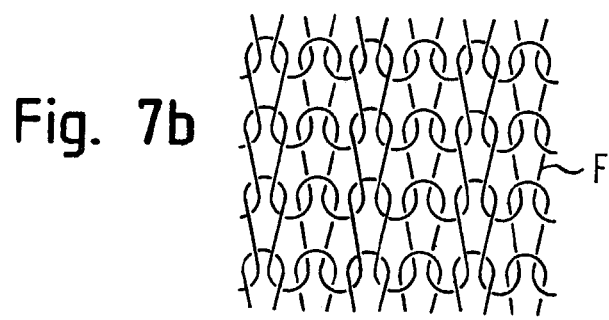
Figure 7C:
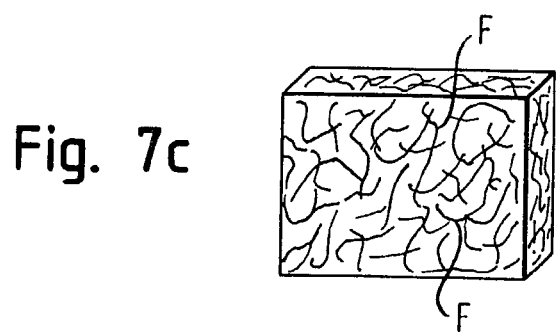

At least the cup-shaped section 19 of the diffusor 18 consists of a material of one or more fibers F of metal wire, examples of which are illustrated in FIGS. 7a to 7c. The material can be a textile, for example a woven fabric of warp- and weft threads F (FIG. 7a), a knitted fabric or knitted mesh of one or more threads F (FIG. 7b), or of a type of fleece (FIG. 7c) consisting of irregular metal wire fibers F hooked into each other. In the embodiment according to FIG. 1, the entire cup-shaped section 19 is of the special material of a metal wire, and gas can arrive into the interior of the gas bag 22 over the entire cup-shaped section 19, so that the entire cup-shaped section 16 forms a filter section. The material of the metal wire is engineered such that particles are filtered out which are contained in the gas G flowing out from the gas generator 14. No further component, such as for instance a gas bag support consisting of sheet metal, is provided between the gas generator 14 and the gas bag wall 22. The flange 21 can likewise consist of a knitted mesh.

Figure 8:
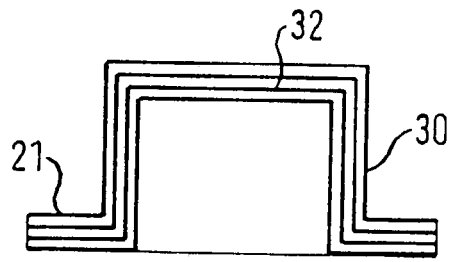
FIG. 8 shows a cross-sectional view through a diffusor according to a fifth embodiment.

The material of the cup-shaped section 19 can be constructed in a single layer (FIG. 2) or in several layers (FIG. 8).

In addition to the function as a vibration-reducing cage and a particle filter, the diffusor 18 in the example shown here additionally serves as a deformation element, in order for example to damp the impact of the head of a vehicle occupant. The knitted mesh of the cup-shaped section 19 is deformed, as indicated by the dashed line in FIG. 2, on impact of a body part and thus reduces the impact energy in order to protect the vehicle occupant from injury.

The diffusor 18 shown here can of course also be used together with a gas generator which is not mounted so as to be able to oscillate.

The gas generator possibly no longer has to have a filter, because this function may be fulfilled completely by the diffusor.

In the embodiment according to FIG. 3, the flange 21 and the cover 32 are made of sheet metal. Almost the entire side wall 30 (except only a short rim on the cover 32 and on the flange 21) is formed by the filter section 34, which is produced from the above-mentioned material of one or more fibers F. In the actual case according to FIG. 3, this is a woven fabric of metal wire. The filter section is closed peripherally and represents the only bridge between the cover 32 and the flange 21, i.e. is arranged so as to be load-bearing between these sections.

In the embodiment according to FIG. 5, the diffusor is produced from a deep-drawn metal sheet which has numerous outflow openings 36 in the region of the side wall 30. On the inner face, a filter section 34 is provided which covers the outflow openings 36 and therefore defines a filter section 34 in the region of the outflow openings 36. In this embodiment, the material which defines the filter section is likewise formed from one or more fibers; in the present case, this is preferably a knitted mesh or knitted fabric.

The embodiment according to FIG. 6 corresponds substantially to the one shown in FIG. 5, with the difference that the filter material does not lie against the side wall 30 on the inner face, but rather on the outer face.

FIG. 8 shows a further embodiment of a diffusor, which consists of several layers of woven fabric, knitted mesh and/or fleece. The entire diffusor, i.e. also the flange 21, is made from this material.

The production of the diffusor shown in FIGS. 1 and 8 preferably takes place from a flat material which is worked by deep-drawing.

What is claimed is:

1. A gas bag module for a vehicle occupant restraint device, said gas bag module comprising a gas generator and a gas bag with a wall, and a diffuser which surrounds said gas generator and has a cup-shaped section, said cup-shaped section having a filter section comprising at least one fiber, through which filter section gas flows out from said gas generator, wherein said cup-shaped section has an edge provided with a laterally projecting ring-shaped flange, said flange comprising a material formed from said at least one fiber.

2. A gas bag module for a vehicle occupant restraint device, said gas bag module comprising a gas generator, a gas bag having a wall, and a diffuser having a cup-shaped section, said cup-shaped section of said diffuser comprising at least partly a filter material comprising at least one fiber, and forming a filter section through which gas flows out from said gas generator, said diffuser, including said filter section, surrounding said gas generator with a defined spacing.

3. The gas bag module according to claim 2, wherein the defined space between said gas generator and said diffuser is empty such that said diffuser does not contact said gas generator and said filter section does not contact said gas generator, said filter section comprising at least one fiber through which filter section gas from said gas generator flows.

4. The gas bag module according to claim 2, in which said filter section is designed such that it acts as a particle filter for through-flowing gas.

5. The gas bag module according to claim 2, wherein said filter section comprises one of a knitted mesh, knitted fabric, woven fabric and an irregular structure of said at least one fiber.

6. The gas bag module according to claim 2, wherein said cup-shaped section comprises a side wall and a cover, said side wall being formed from a material comprising said at least one fiber.

7. The gas bag module according to claim 2, wherein at least said cup-shaped section comprises a material formed from said at least one fiber.

8. The gas bag module according to claim 2, in which said cup-shaped section is designated as a deformation element capable of being deformed on impact of an occupant's body part.

9. The gas bag module according to claim 2, in which said at least one fiber is a metal wire.

10. The gas bag module according to claim 2, in which said gas generator is held in an elastic bearing so as to be able to oscillate.

11. The gas bag module according to claim 2, wherein said gas generator is a filter-less gas generator.

12. The gas bag module according to claim 2, wherein the defined spacing between said gas generator and said diffuser is at a distance such that said gas generator is able to oscillate unimpeded inside said diffuser.

13. A gas bag module for a vehicle occupant restraint device, said gas bag module comprising a gas generator and a gas bag with a wall, and a diffuser which surrounds said gas generator and has a cup-shaped section, wherein said cup-shaped section is made entirely of a filter material, said filter material comprising at least one fiber.

14. The gas bag module according to claim 13, in which said diffuser is designed such that it acts as a particle filter for through-flowing gas.

15. The gas bag module according to claim 13, wherein said diffuser comprises one of a knitted mesh, knitted fabric, woven fabric and an irregular structure of said at least one fiber.

16. The gas bag module according to claim 13, wherein said cup-shaped section comprises a side wall and a cover.

17. The gas bag module according to claim 13, in which said cup-shaped section is designated as a deformation element capable of being deformed on impact of an occupant's body part.

18. The gas bag module according to claim 13, in which said at least one fiber is a metal wire.

19. The gas bag module according to claim 13, in which said gas generator is held in an elastic bearing so as to be able to oscillate.

20. The gas bag module according to claim 13, wherein said gas generator is a filter-less gas generator.

* * * * *